United States Patent [19]
Hudson

[11] 3,782,878
[45] Jan. 1, 1974

[54] ROTARY EXTRUDER AND LOADER

[75] Inventor: James A. Hudson, Brooklawn, N.J.

[73] Assignee: Campbell Soup Company, Camden, N.J.

[22] Filed: Mar. 14, 1972

[21] Appl. No.: 234,547

[52] U.S. Cl.............. 425/314, 425/382, 425/464, 99/85
[51] Int. Cl. ..................... A23l 1/16, A21c 9/02
[58] Field of Search................. 425/310, 314, 382, 425/464; 53/266, 282; 99/85

[56] References Cited
UNITED STATES PATENTS

| | | | |
|---|---|---|---|
| 2,977,902 | 4/1961 | Johannes | 99/85 UX |
| 3,061,440 | 10/1962 | Johannes | 99/85 |
| 3,162,147 | 12/1964 | Amato | 99/85 |
| 3,481,109 | 12/1969 | Pavey | 53/282 X |
| 3,642,406 | 2/1972 | Irving | 425/382 X |
| 3,650,716 | 3/1972 | Brossard | 425/464 X |

Primary Examiner—R. Spencer Annear
Attorney—Donald C. Simpson, Esq.

[57] ABSTRACT

Apparatus is provided for continuously extruding elongated products through a rotary extruder head. For this purpose, a series of dies are mounted in the bottom of a rotary extruder head and there is provided means to continuously force the product through the dies. The product is cut from the dies and permitted to drop into a series of suitable receptacles advancing in spaced relation on a conveyor located below the extrusion dies. There is provided funnel means which rotates with the dies to guide the products into the receptacles. In one embodiment in which spaghetti is extruded, there is provided means to trim the extruded products to a predetermined length before they are cut and permitted to drop into the cans. In another embodiment in which noodles are extruded, a series of blades are provided at spaced intervals along the path of movement of the dies to sever the products sequentially during extrusion thereby to yield products of relatively short lengths. In each embodiment, a member underlies the dies and rotates therewith to accept extruded products in the absence of one or more cans, and a scraper removes the extruded products from the member.

13 Claims, 4 Drawing Figures

FIG. 1.

ROTARY EXTRUDER AND LOADER

The present invention relates to apparatus for continuously extruding products, for example, spaghetti or noodles through a continuously rotating extruder head.

A primary object of the present invention is to provide novel apparatus for extruding products at relatively high production rates and in such a manner that the products may be easily collected for later handling or processing.

A further object of the present invention is to provide a novel extruder for products such as spaghetti or noodles wherein the product may be cut directly from the extruder and deposited in suitable receptacles traveling beneath the extruder head.

As a further object, the present invention provides for a product extruder means to accept extruded products in the absence of receiving cans and to return the accepted products to a mixer for re-extrusion or deposit the product in a scrap receptacle.

More specifically, the present invention provides apparatus for continuously extruding, cutting and loading into cans products, for example, spaghetti, noodles, macaroni or the like. The apparatus comprises an extruder for receiving a quantity of the product, means to supply the product to the extruder head and to apply pressure therein, and a series of dies disposed in spaced relation in a circle in the bottom of the extruder head for extruding the product into strands for loading into a series of similarly spaced cans advancing on a conveyor located below the dies. The extruders head and dies, as well as the conveyor, are rotatable about a common axis and there is provided guide means in the form of a series of funnels interposed between the dies and the cans and rotatable with the extruder head for guiding the products into the cans as the extruder head rotates and the products are being extruded. Empty cans can be spaced and fed to the apparatus by means of a screw-like feed conveyor, and filled cans be removed from the conveyor by means of a belt-type conveyor. Depending on the desired length of the products, one or more shear blades are provided to scrape across the bottoms of the dies to sever the products. In addition, a member is provided below the cans to accept severed products in the absence of one or more receiving cans, and a scraper is provided to remove the products from the platen. In one embodiment, there is provided means to trim the extruded products to a uniform length before the products are severed from the dies.

These and other objects, features and advantages of the present invention should become apparent from the following description when taken in conjunction with the accompanying drawings, in which:

FIG. 1 is a fragmentary plan view of a rotary extruder and loader which embodies the present invention and which extrudes relatively long products such as spaghetti;

Figure 1:
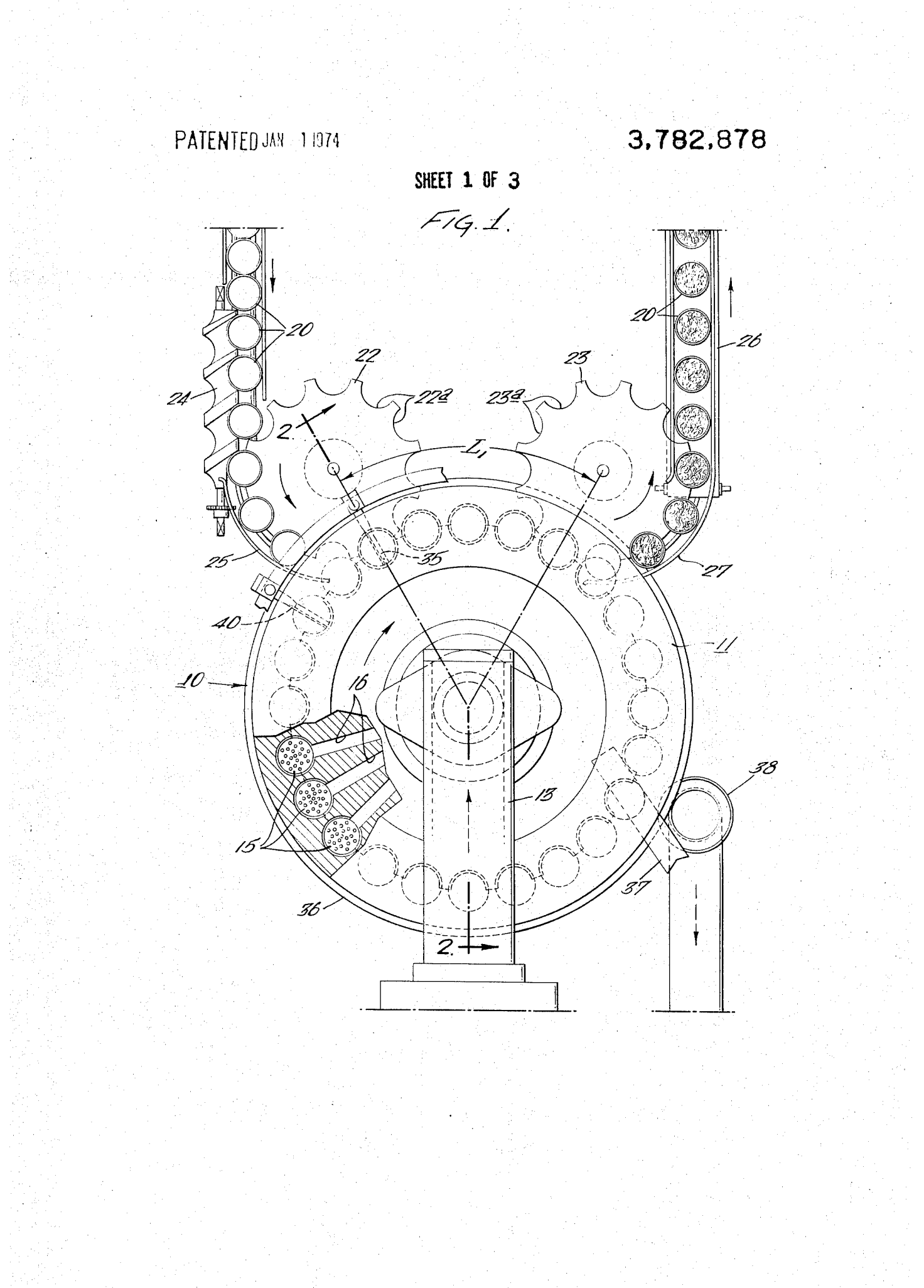
Figure 2:
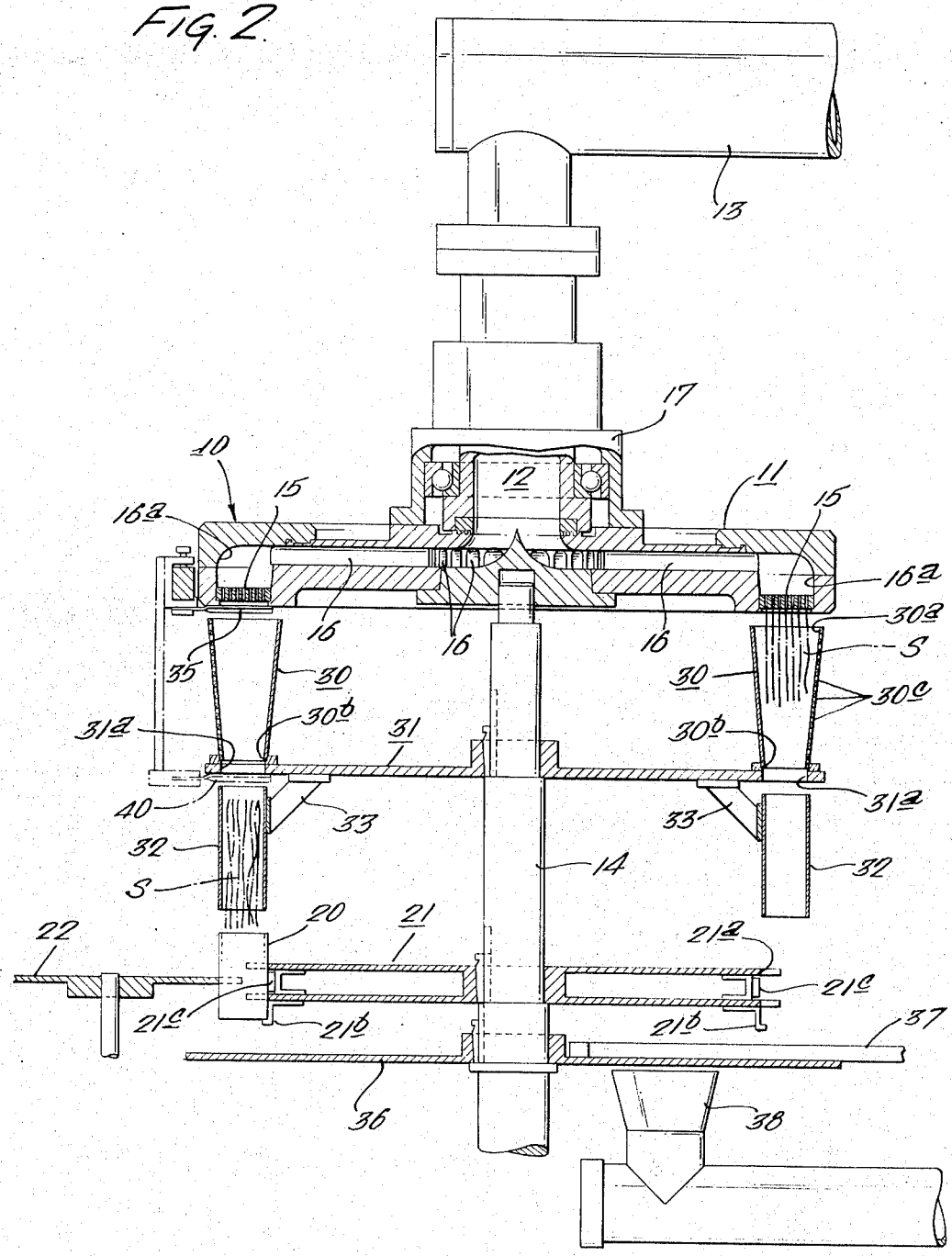
FIG. 2 is a sectional view taken along lines 2—2 of FIG. 1.

Referring now to the drawings, there is illustrated in FIG. 1 rotary extruder-loader apparatus 10 embodying the present invention. As seen therein, and in FIG. 2, the apparatus comprises a hollow rotary extruding head or reservoir 11 having a central inlet 12 connected through a supply conduit 13 to a supply of a mixed product to be extruded. As best seen in FIG. 2, the head 11 is rotatably coupled to the conduit by a collar 17. In the present instance, the head 11 is cylindrical and is mounted for rotation on a vertical axis by means of an upstanding shaft 14 which is fastened centrally to the underside of the head 11 and which is coupled through suitable means to a drive assembly (not shown) which rotates the shaft 14 and the head 11 forwardly in the direction indicated by the arrow in FIG. 1.

In the form of the invention of FIG. 1, the products are extruded downwardly in strands S from the head 11, as illustrated in broken lines in FIG. 2, as the head rotates. To this end, a series of dies 15, 15 are located in a circle concentric with the axis of rotation of the shaft 14. A like series of passages 16, 16 extend radially outward in the head 11 to provide communication between the inlet 12 and the dies 15, 15. An enlargement 16a, 16a is provided in the passages 16, 16 above each die 15, 15. Pressure is applied in the conduit 13 and the passages 16, 16 by means of conventional mixing and pumping apparatus which is not shown.

The strands S are continuously extruded as the head 11 rotates, and conveyor means is provided to advance containers or cans 20, 20 into underlying registry with the dies 15, 15 in a loading zone to accept the strands S. In the illustrated embodiment, the conveyor means includes a wheel 21 which is secured to the shaft 14 below the head 11 and which is rotatable with the head 11. A series of curved recesses 21a, 21a are provided in the periphery of the wheel 21 for receiving the cans 20, 20 and a like series of support brackets 21b, 21b are associated with the recesses 21a, 21a to engage the bottoms of the cans 20, 20. The cans 20, 20 may be releasably secured in the recesses 21a, 21a by means of magnetic keepers 21c, 21c which are also associated with each recess 21a, 21a in the wheel 21. With this structure, the cans 20, 20 are properly and securely positioned in underlying registry with the dies for accepting the strands S.

In order to transfer empty cans to the conveyor wheel 21 and to remove filled cans therefrom, first and second transfer wheels 22 and 23, respectively, are provided. As best seen in FIG. 1, the first transfer wheel 22 is rotatable about a vertical axis and has a series of peripheral recesses 22a, 22a for receiving the cans 20, 20 from a screw conveyor 24 which is disposed tangentially to the transfer wheel 22 to feed and space the cans 20, 20 to effect smooth transfer to the wheel 22. A curved curb 25 cooperates with the transfer wheel 22 to maintain the cans 20, 20 engaged in their recesses 22a, 22a until transferred to the recesses 21a, 21a in the conveyor wheel 21. The second transfer wheel 23 is similar to the first wheel 22 and has a series of peripheral can-receiving recesses 23a, 23a. A belt conveyor 26 is disposed tangentially to the second wheel 23 for conveying the cans 20, 20 away from the apparatus 10 for further processing. A curved camming element 27 is associated with the second wheel 23 and the belt conveyor 26 to maintain the filled cans engaged with the transfer wheel 23. The camming element 27 also extends into the path of movement of the cans 20, 20 on the conveyor wheel 21 to disengage the cans 20, 20 from their magnetic keepers 21c, 21c. In this embodiment, the cans 20, 20 are engaged with the conveyor wheel 21 in the loading zone L₁ for only a portion of its peripheral extent, which in the present instance, is an arc of less than 90°.

For the purpose of directing the strands S into the cans 20, 20 there may be provided guide means in the form of a series of funnels 30, 30 (FIG. 2) corresponding in number to the series of dies 15, 15 and mounted to the shaft 14 to move in unison with the head 11. In the embodiment illustrated in FIGS. 1 and 2, a circular disc 31 is secured to the shaft 14, and the funnels 30, 30 are mounted in spaced relation about the periphery of the disc 31. The upper end 30a of each funnel 30 is located closely adjacent its respective die 15, and the lower end 30b of each funnel 30 registers with an aperture 31a in the disc 31. A supplemental guide tube 32 is associated with each funnel 30 and is mounted below the disc 31 in registry with the aperture 31a by means of a bracket member 33. It is noted that the upper end of each guide tube 32 is spaced from the underside of the disc 31. Preferably, the funnels 30, 30 are provided with a plurality of ports 30c, 30c to permit air to circulate through the funnels 30, 30 for treating the strands S immediately upon extrusion to control various attributes of the strands.

In order to load the strands S into the cans 20, 20, there is provided means to cut the extruded products from the dies 15, 15 and to permit the strands S to drop freely into the cans. In the embodiment illustrated in FIGS. 1 and 2, this is accomplished by a shear member or blade 35 (FIG. 2) mounted in scraping relation with the underside of the dies 15, 15. As best seen in FIG. 1, the blade 35 extends radially inward from the periphery of the extrusion head 11 and is located adjacent the juncture of the first transfer wheel 22 and the conveyor wheel 21. Thus, the strands S are severed from each extruding die 15 as the dies advance in succession past the blade 35 with the severed strands S dropping into the underlying cans 20, 20 through the funnels 30, 30 and the guide tubes 32, 32.

There may be occasions when one or more cans are absent from the series of cans 20, 20 being fed to the apparatus 10. In order to prevent strands S from being wasted or from interfering with the operation of the apparatus 10, means is provided to accept the strands in the absence of one or more cans and to return the accepted strands to a mixer for re-extrusion. To this end, a circular platen 36 is secured to the sbaft 14 below the conveyor wheel 21. As best seen in FIG. 2, the platen 36 extends outwardly beyond the perimeter of the head 11 so that in the absence of a receiving can the strands S fall on the platen 36. Strands which have fallen on the platen 36 are removed by means of a scraper 37. As seen in FIG. 1, the scraper 37 is disposed at an angle with respect to the path of movement of strands S on the platen 36 to displace the fallen strands outwardly and into an upwardly-open receptacle 38 located adjacent the periphery of the platen 36. The receptacle 38 is connected to a mixer (not shown) which operates to admix fallen strands with fresh product for re-extrusion through the dies 15, 15. With this structure, waste is eliminated and the extrusion apparatus is maintained relatively clean in operation.

Due to various factors, such as pressure fluctuations in the extrusion head or air entrapment, or the like, there may be a tendency for some of the strands S to have a length different from the rest, particularly when the strands are relatively long as with spaghetti. In order to insure that all of the strands which are loaded into a can are of the same length, and hence, of the same weight, etc., there is provided means to trim the strands S. In the embodiment illustrated in FIGS. 1 and 2, the trimming means includes a knife 40 which extends inwardly from the periphery of the disc 31 and engages the underside of the disc 31. As seen in broken lines in FIG. 2, the knife 40 extends across the aperture 31a and in the space between the underside of the disc 31 and the top of the guide tube 32. As can be seen in FIG. 1, the trim knife 40 is located ahead of the loading zone $L_1$ and ahead of the shear blade 35 so that the strands S are trimmed to the proper length before being severed and loaded into the cans. It is noted that trim pieces of the strands S which are cut by the knife 40 fall onto the platen 36 and are re-extruded or deposited into a scrap receptacle in the manner noted heretofore in connection with the strands which drop onto the platen 36 in the absence of receiving cans.

In operation, the cans 20, 20 are supplied to the recesses in the conveyor wheel 21 by the coaction of the screw conveyor and first transfer wheel 22, and the cans 20, 20 are removed from the conveyor wheel 21 by the coaction of the second transfer wheel 23 and the belt conveyor 26. The magnetic elements 21c, 21c operate to secure the cans 20, 20 to the wheel 21, and the support brackets 21b, 21b operate to space the cans 20, 20 from the platen 36 to keep the cans free from contact with fallen strands S. The strands S are extruded as the head 11, conveyor wheel 21, guide means 30 and 32, and the platen 36 rotate in unison upon rotation of the shaft 14. The strands S are trimmed as they advance past the knife 40, and the strands S are severed as they advance past the blade 35, whereby they drop into the cans 20, 20 carried by the conveyor wheel 21 below the dies 15, 15. The trimmings as well as strands which may have fallen on the platen 36 in the absence of receiving cans are removed from the platen 36 by the scraper 37.

Figure 3:
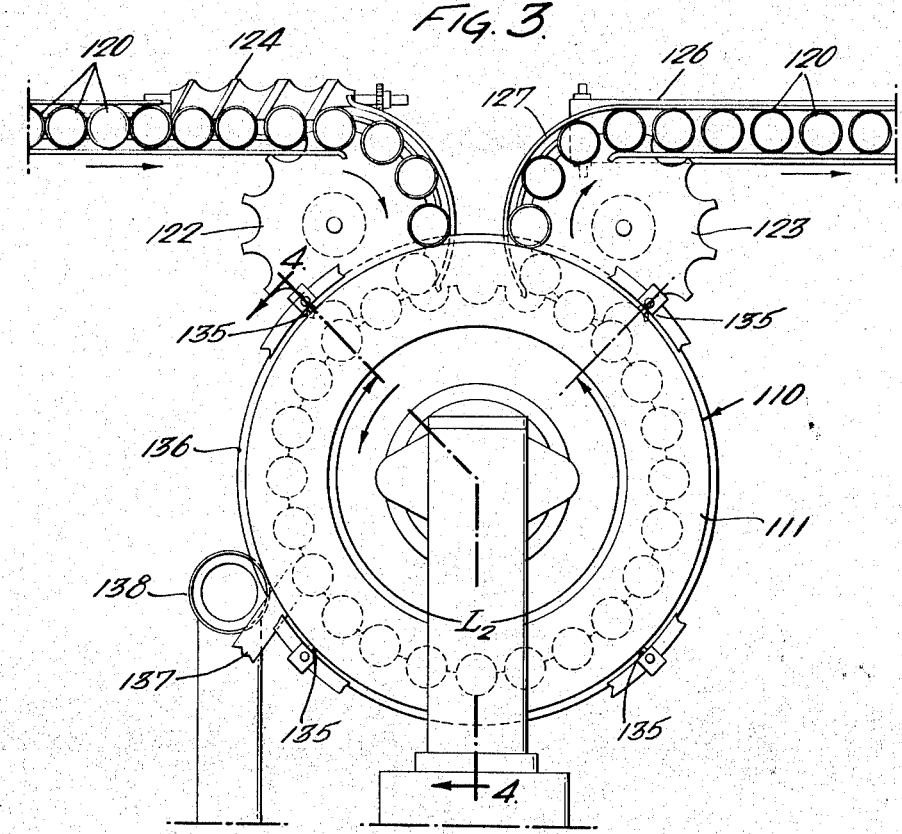
FIGS. 3 and 4 are views similar to FIGS. 1 and 2 but of a modified embodiment of the present invention which extrudes shorter products such as noodles.
Figure 4:
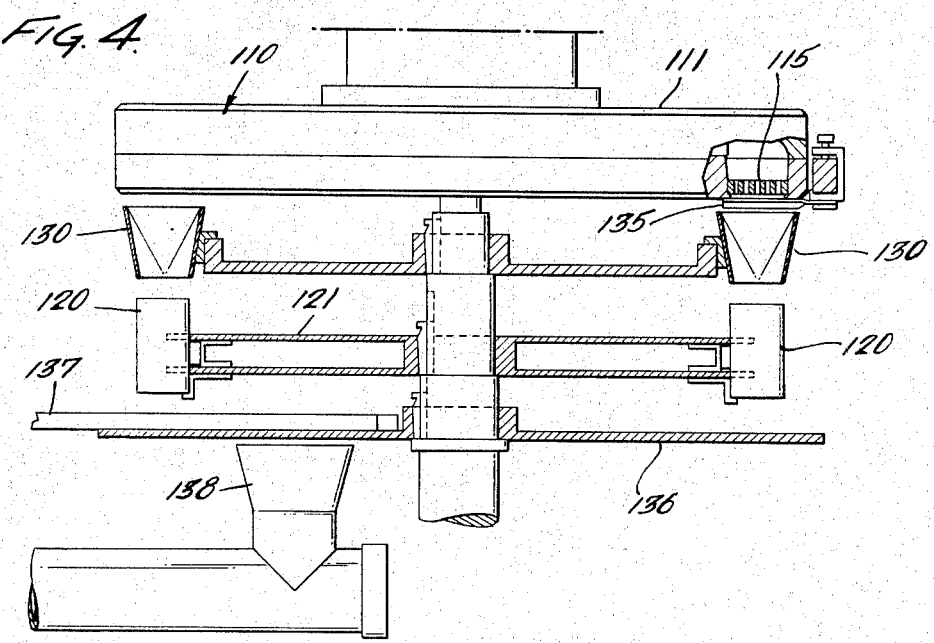

As described thus far, the apparatus 10 is adapted to extrude relatively long products such as spaghetti. If it is desired to extrude shorter produfts, such as noodles, a modified embodiment 110 of the apparatus 10 may be provided. As illustrated in FIGS. 3 and 4, the modified apparatus 110 is similar to the apparatus 10, having an extruder head 111, a can conveyor wheel 121, a platen 136 with a cooperating scraper 137, and a receiver 138. In addition, guide means comprising a series of funnels 130, 130 are provided. Because of the shorter lengths of the noodles, the funnels 130, 130 are shorter than the funnels 30, 30, and the supplemental guide tubes 32, 32 such as employed in the embodiment of FIGS. 1 and 2 are unnecessary.

As in the spaghetti-extruding embodiment, a srew conveyor 124 cooperates with a first transfer wheel 122 to supply cans 120, 120 to the conveyor wheel 121. A belt conveyor 126 also cooperates with a second transfer wheel 123 and guide curb 127 to remove filled cans from the apparatus. The operation of the apparatus 10 and 110 is substantially the same except for some important differences noted below. For instance, in the apparatus 110, the transfer wheels 122 and 123 are arranged with respect to the conveyor wheel 121 to cause each can 20 to be engaged with the conveyor wheel 121 in a loading zone $L_2$ which corresponds to substantially three quarters of the periphery of the wheel 21. The strands which are extruded from the dies 115, 115 are severed at four locations by blades 135, 135 which are located at equally spaced intervals about the periphery of the head 11. Thus, with this embodiment, groups of relatively short strands are charged into each can before the can is discharged from the apparatus 110.

In view of the foregoing, it should be apparent that there has now been provided improved apparatus for extruding, cutting and loading products into cans in a continuous and efficient manner.

While preferred embodiments of the present invention have been described in detail, various modifications, alterations and changes may be made without departing from the spirit and scope of the present invention as defined in the appended claims.

I claim:

1. Apparatus for extruding, cutting and loading products into a series of containers advancing in spaced relation in an arcuate path comprising: an extruder head for receiving an extrudable quantity of the products under pressure and having an inlet, a plurality of dies carried by said extruder head in communication with said inlet, means for displacing said dies in timed relation and into overlying registry with said containers to cause said products to be extruded through the dies and to be loaded into said containers in a loading zone as said containers advance, and cutting means for sequentially cutting the extruded products from said dies to cause the extruded products to fall from their extruding dies and into said underlying containers.

2. Apparatus according to claim 1 including guide means interposed between each die and its underlying container and means coupling said guide means to said die displacing means to cause said guide means to move with said dies and in timed relation with said containers for guiding said products from the dies and into the containers during extrusion.

3. Apparatus according to claim 1 including a member located below said containers in said path for accepting extruded products, a receiver associated with said member and scraper means for displacing extruded products from said member and into said receiver.

4. Apparatus according to claim 1 wherein said extruder head includes a hollow cylindrical head having a central inlet with said dies being mounted at peripherally spaced locations in said head so that upon rotation of said extruder head said dies travel in a circular path, said die displacing means including a shaft connected to said cylindrical head and rotatable about a vertical axis, and a radially extending passage in said head providing communication between said inlet and one of said series of dies.

5. Apparatus according to claim 4 including conveyor means extending in an arc around said shaft for advancing said containers in underlying registry with said dies, said conveyor means including a conveyor wheel secured to the said shaft and having a series of peripheral recesses for receiving said containers, bracket means associated with said recesses for engaging and supporting the bottom of each container, and magnetic keeper means associated with each recess to releasably secure each container therein, whereby said containers are advanced in underlying registry with said dies upon rotation of said shaft.

6. Apparatus according to claim 5 including a feed conveyor for supplying empty containers to said conveyor wheel and an unloading conveyor for removing loaded containers from said conveyor wheel, a first transfer wheel interposed between said feed conveyor and said conveyor wheel, and a second transfer wheel interposed between said conveyor wheel and said unloading conveyor, and camming means associated with said second transfer wheel and extending into the path of movement of the containers on said conveyor wheel to release said containers from said magnetic keeper means for transfer to said unloading conveyor.

7. Apparatus according to claim 1 wherein each of said dies has a planar bottom surface and said cutting means includes at least one shear blade located in said loading zone and engaging said bottom surface for severing the products extruded through the dies as each die advances in succession past the blade.

8. Apparatus according to claim 2 wherein said guide coupling means includes a disc spaced below said head, said disc having a series of apertures like in number to said dies and in underlying registry therewith, and including knife means disposed in advance of said loading zone and engaging below said disc to sever the extruded products depending through the apertures as the apertures advance in succession past the knife.

9. Apparatus according to claim 8 wherein said guide means includes a series of perforated funnels corresponding in number to said dies and mounted to said disc in registry with the apertures therein, and including a series of hollow guide tubes in registry with said apertures and funnels and depending from said disc to direct the extruded products into the underlying containers after being severed by the cutting means.

10. Apparatus according to claim 7 wherein said loading zone extends throughout a major portion of the peripheral extent of said extruder head, and including a plurality of shear blades located at equally spaced intervals in said loading zone, so that the extruded products are severed a plurality of times as the dies advance through the loading zone.

11. Apparatus for extruding products comprising an extruder head having an inlet, means to rotate said extruder head about a central axis, means to supply an extrudable quantity of products under pressure to the inlet of said extruder head, a plurality of dies carried by said extruder head equally spaced about said central axis and positioned with the face of each of said dies perpendicular to said central axis, and means providing communication between each of said dies and said inlet for passage of said product.

12. Apparatus in accordance with claim 11 in which the means providing communication between the dies on the inlet comprises means defining openings in said extruder head in which each die is carried and a separate passage extending from said inlet to each of said openings.

13. Apparatus in accordance with claim 11 including shear means positioned beneath said extruder head for engagement by said dies to cut the extruded products from said dies.

\* \* \* \* \*